INVENTORS
Charles B. Holmer
Kjell Olsson
BY Dominik + Stein
ATTORNEYS

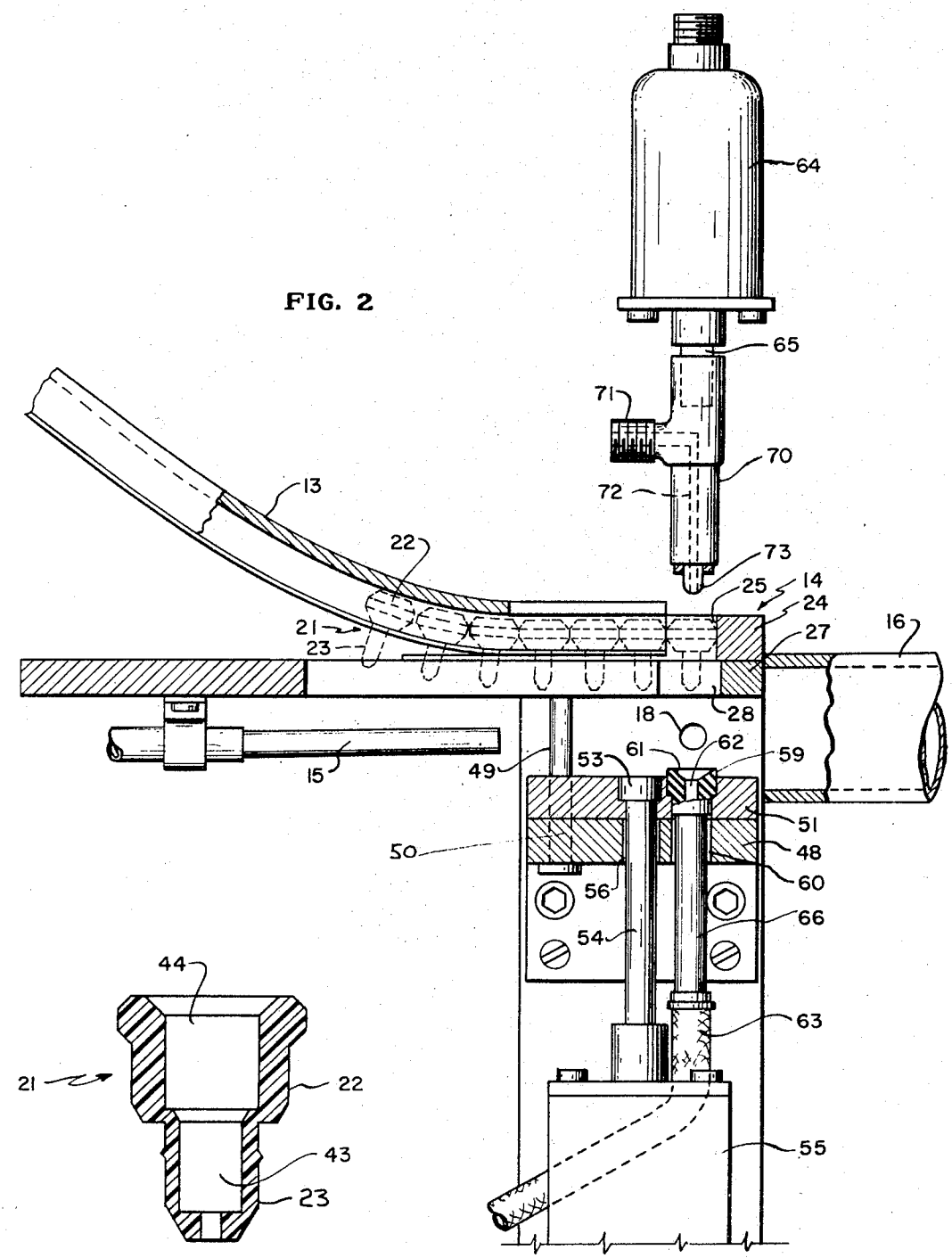

June 10, 1969 C. B. HOLMER ET AL 3,448,854
VALVE TESTING MACHINE
Filed June 23, 1965 Sheet 3 of 5
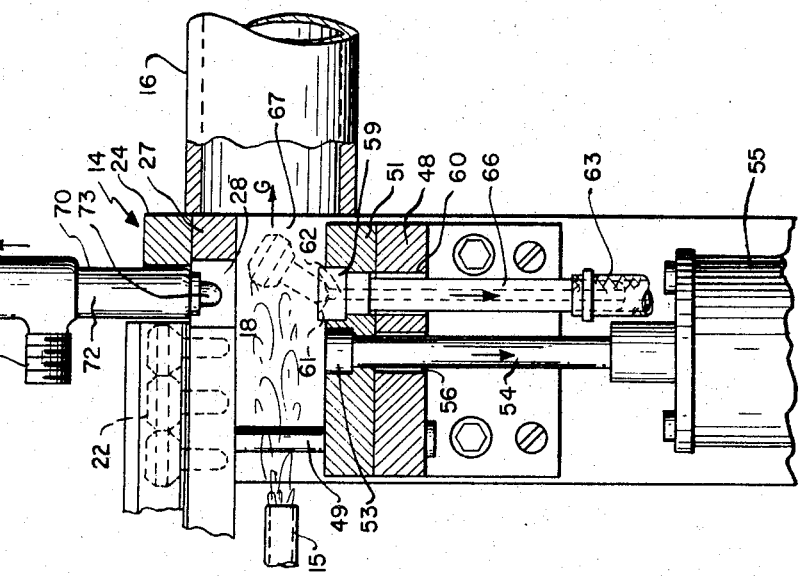
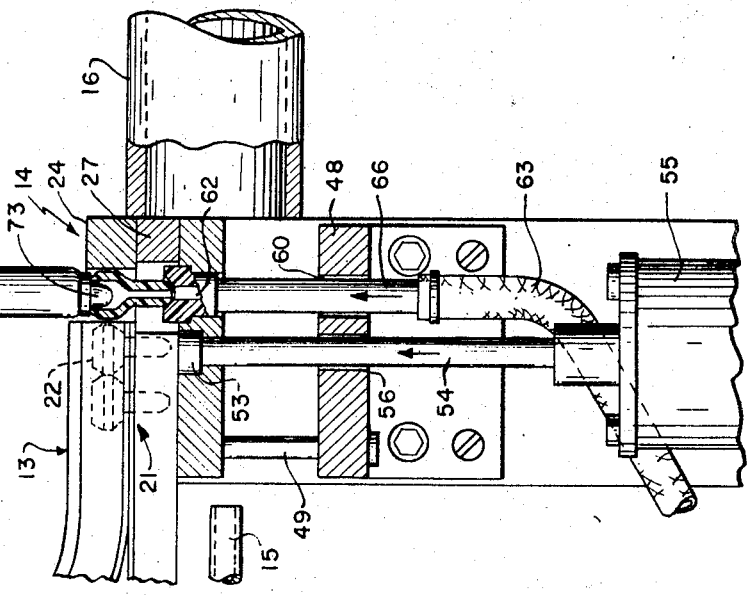
INVENTORS
Charles B. Holmer
K Jell Olsson
BY Dominick & Stein
ATTORNEYS June 10, 1969 C. B. HOLMER ET AL 3,448,854
VALVE TESTING MACHINE
Filed June 23, 1965

INVENTORS
Charles B. Holmer
Kjell Olsson
BY Dominik + Stein
ATTORNEYS

United States Patent Office 3,448,854
Patented June 10, 1969

3,448,854
VALVE TESTING MACHINE
Charles B. Holmer, Algonquin, and Kjell Olsson, Crystal Lake, Ill., assignors to Seaquist Valve Company, Division of Pittsburgh Railway Co., Cary, Ill., a corporation of Pennsylvania
Filed June 23, 1965, Ser. No. 466,398
Int. Cl. G01m 3/28; B65d 83/14
U.S. Cl. 209—72                           19 Claims

ABSTRACT OF THE DISCLOSURE

A testing machine especially useful for automatically testing the orifices in aerosol valve bodies consisting of means to hold individual valve bodies, air jet nozzles and engageable with the orifices of said valve bodies, jet air supply means to said nozzles, pressure sensing means opposite said orifices to detect the pressure of air passing through said orifices and jets to collect said valve bodies in accord with detected favorable or unfavorable pressure response.

This invention relates in general to testing apparatus and more particularly to apparatus for testing the orifice in an aerosol valve body.

Aerosol valve bodies are generally fabricated of a durable plastic material, and are molded on a mass production basis. An orifice is provided in each of the valve bodies through which the propellant and the product is dispensed and, in order for the aerosol valve to function properly, the orifice must be of a predetermined size. In the past, the valve bodies were individually inspected, using a pressure actuated mechanism, to determine that the orifices were of at least a fixed size. It is apparent that inspecting valve bodies in this fashion is a time consuming task and therefore relatively expensive. When the many hundreds of thousands of valve bodies which are manufactured each year are considered, it can be seen that the labor cost for inspecting the valve bodies can be enormous.

It is also apparent that individually inspecting the valve bodies is a tedious task. A skilled operator can inspect several thousand valve bodies in a day, but this rate of inspection greatly lags the number of valve bodies required. Furthermore, even the most conscientious operator after inspecting the valve bodies for several hours becomes careless because of the monotony, and defective valves are allowed to pass instead of being rejected. This latter possibility is also enhanced due to the fact that the valve bodies are generally inspected to determine whether the pressure of the air passed through the orifice falls within a predetermined pressure range, the valve bodies being considered defective if the pressure is above or below this range. After a period of time, an operator tends to inspect the pressure to determine that it is at least greater than the minimum acceptable value but fails to determine whether it is greater than the maximum acceptable value.

It is therefore an object of this invention to provide apparatus for testing the orifice formed in an aerosol valve body.

It is still another object of this invention to provide apparatus for testing the orifice formed in an aerosol valve body to determine whether the orifice is of a size within a predetermined range.

It is still another object of this invention to provide apparatus for testing the orifice formed in an aerosol valve body which is adapted to determine whether the orifice is of a size within a predetermined range and to automatically reject those which are not. In this respect, it is contemplated that the apparatus perform these operations automatically.

It is still a further object of this invention to provide apparatus for automatically testing aerosol valve bodies to determine that the orifice formed therein is of a proper size which is adaptable to automatic feeder apparatus so that aerosol bodies can be constantly fed to it.

It is a still further object of this invention to provide apparatus for automatically testing the orifice size of an aerosol valve body which is capable of automatically testing them at a rate far in excess of any rate heretofore generally possible.

Other objects of the invention will in part be obvious and will in part appear hereinafter.

The objectives outlines above are accomplished with the apparatus of the present invention which generally includes an inclined ramp that is adapted to convey a constant source of valve bodies to a test point whereat they are individually captivated and tested. At the test point, each valve body has a jet of air passed through the orifice formed therein, and a pressure sensitive device detects whether the pressure of the jet of air which passes through the orifice falls within a predetermined range. If the pressure falls within this range, indicating that the valve body is acceptable, the pressure sensitive device actuates another source of air pressure which blows the valve body, which is released simultaneously with the activation of this source of air pressure, into a channeling member which directs it to a collecting bin or the like. If the pressure falls outside of this predetermined range, a still another source of air pressure is activated which blows the valve body into a channeling member which directs it into a collecting bin or the like for defective valve bodies.

Each of the above operations is performed automatically by circuitry, described fully hereinafter, including cam operated microswitches, solenoid valves, relays and the like.

The testing apparatus can be fed by hand, by merely keeping a continuous supply of valve bodies in the above mentioned inclined ramp, or the ramp can be adapted to automatic feeder apparatus which provides a continuous supply of valve bodies.

The invention accordingly comprises the several steps and the relation of one or more such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings; in which:

FIGURE 2 is a partial sectional view of the testing apparatus of FIG. 1;

FIGURE 7 is a sectional view of a typical valve body;

FIGURES 8 and 9 are sectional views of the testing apparatus of the present invention, illustrating the same in two operative positions;

Similar reference characters refer to similar parts throughout the several views of the drawings.

Figure 1:
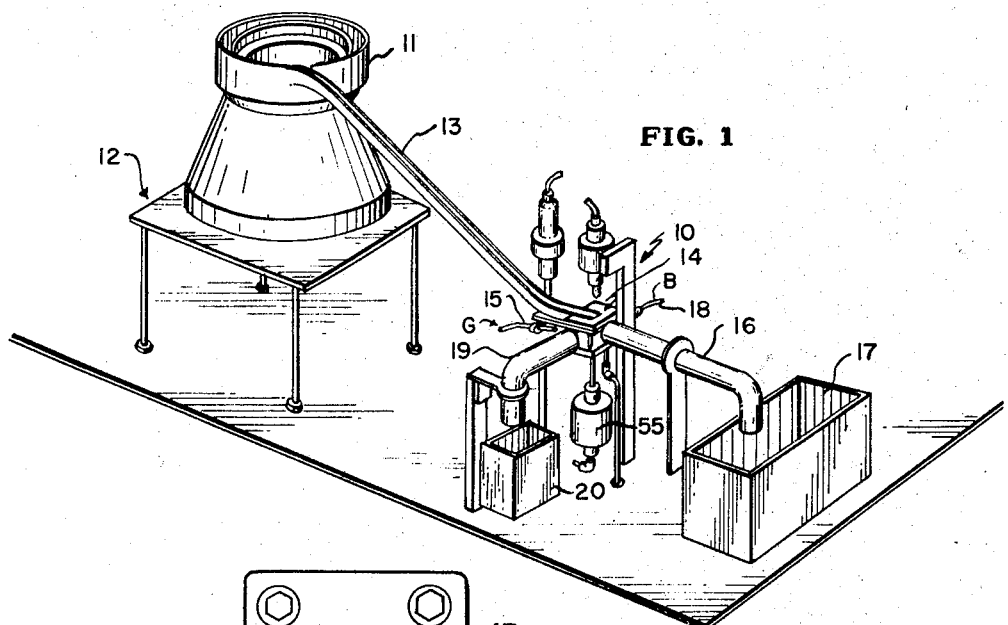
FIGURE 1 is a perspective view illustrating testing apparatus exemplary of the present invention, with automatic feeder apparatus adapted thereto.

Referring now to the drawings, in FIG. 1 there is shown a test apparatus 10 exemplary of the present invention, adapted to be continuously supplied valve bodies from automatic feeder apparatus 11, which may be, for example, a vibratory feeder bowl of the type manufactured by Automation Devices, Inc., Erie, Pa. The vibratory feeder bowl 11 is mounted in a raised position, as for example, on a table 12 and the inclined ramp 13 of the test apparatus 10 is coupled to it in a fashion such as to continuously supply valve bodies to the ramp 13. The lower end of the inclined ramp 13 is coupled to a valve body captivating member 14 which individually captivates the valve bodies so that they can be tested, in the manner hereinafter described, to determine whether the orifice formed therein is of proper size.

If the valve body is acceptable, an air jet from a source not shown is directed through the hose 15 (only partially shown) and blows the valve body into the hollow cylindrical shaped conveying tube 16 which directs it into a collecting bin 17 or the like. If the valve body is defective, it is blown by a jet of air from another source not shown through a tube 18 (only partially shown) into a hollow cylindrical shaped conveying tube 19 which directs it into a collecting bin 20 or the like for defective valve bodies.

In operation, the valve bodies are fed continuously from the vibratory feeder bowl 11 into the ramp 13 which conveys them to the valve body captivating member 14 whereat they are individually tested to determine whether the orifice formed therein is of proper size. After being tested, the valve bodies are either accepted and blown through the conveying tube 16 into the bin 17 or are rejected and blown through the conveying tube 19 into the collecting bin 20. The structural details of the valve body captivating member 14, the components for testing the size of the orifice formed in the valve bodies and the operation of the test apparatus 10, is described in detail in the paragraphs which follow.

Referring now to FIG. 7, it can be seen that the valve bodies 21 have an enlarged valve stem receiving portion 22 and a reduced diameter dip tube attachment tail 23. An orifice 43 extends through the dip tube attachment tail 23 into a valve stem receiving cavity 44 formed in the enlarged valve stem receiving portion 22.

In FIGS. 2–6, it can be seen that the valve bodies 21 are confined within the inclined ramp 13 with the dip tube attachment tails 23 thereof extending downwardly through a slot 45 (FIG. 3) formed in the bottom wall of the ramp 13. As the valve bodies 21 leave the end of the inclined ramp 13 they are restrained within a slot 25 which has an arcuate end wall substantially corresponding in size with the valve stem receiving portion 22 of the valve bodies 21, formed in a top plate member 24, which can be best seen in FIG. 3.

Figures 3, 6:
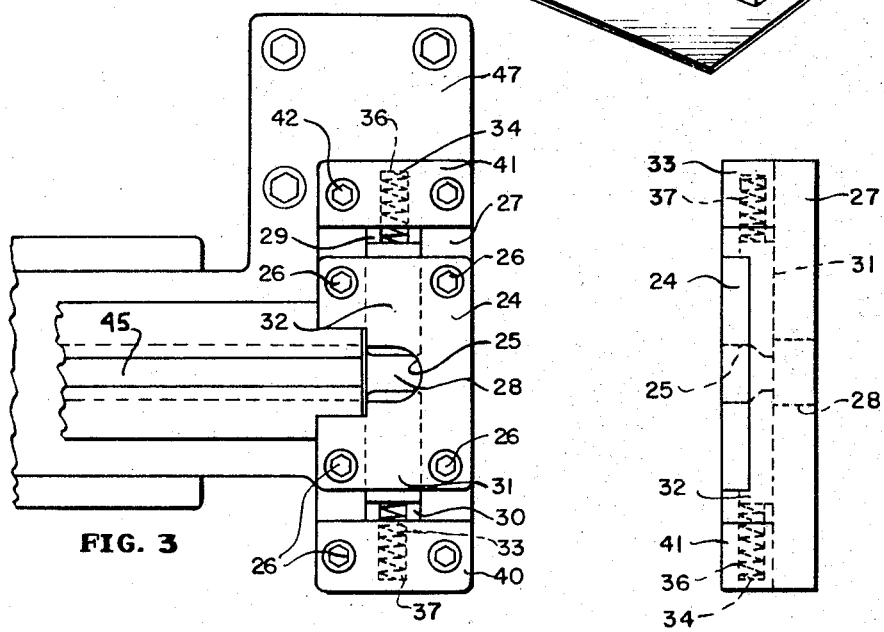
FIGURE 3 is a partial top view of the components of the testing apparatus which captivate the individual valve bodies.
FIGURE 6 is a side sectional view of the valve body captivating components of the testing apparatus.

The top plate member 24 is fixedly secured by means of set screws 26 or the like to a rectangular shaped member 27 which is best seen in FIGS. 3 and 6. The rectangular shaped member 27 has an aperture 28 formed therein which is slightly larger than the size of the enlarged valve stem receiving portions 22 of the valve bodies 21. A pair of arcuately grooved slots 29 and 30 are formed in the top wall of the rectangular shaped member 27 and form a guide for a pair of plungers 31 and 32 which are arranged to extend over the aperture 28 to prevent the valve bodies 21 from dropping through the aperture 28. A pair of spring retaining members 40 and 41 are fixedly secured by means of set screws 42 or the like to the top wall of the rectangular shaped member 27 and have apertures 36 and 37 formed therein, respectively, for receiving and retaining springs 33 and 34. The springs 33 and 34 are secured to the ends of the plungers 31 and 32, respectively, and forcibly urge them outwardly to overlap the aperture 28, as shown in FIG. 3. The top plate member 24 and the rectangular shaped member 27 are both secured to the top wall of a frame member 47 of the test apparatus 10.

Figure 4:
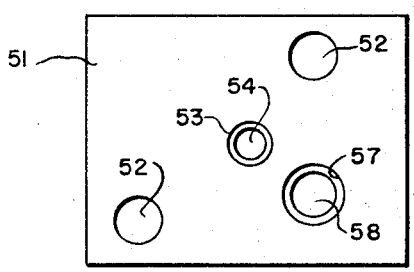
FIGURE 4 is a top plan view of the lower movable plate member of the testing apparatus.
Figure 5:
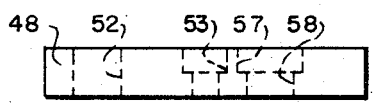
FIGURE 5 is a side view of the lower movable plate member of FIG. 4.

A lower stop member 48 is fixedly retained in spaced relation below the rectangular shaped member 27 by means of a pair of threaded screws 49 (only one shown) which are passed through apertures 50 formed therein. Immediately above and normally resting on the top wall of the lower stop member 48 is a rectangular shaped lower movable plate member 51. The movable plate member 51, as best seen in FIGS. 4 and 5, has two correspondingly positioned apertures 52 for receiving the threaded screws 49. The apertures 52 are slightly larger in diameter than the threaded screws 49 so that the movable plate member 51 can be raised above the stop member 48, in the manner described hereinafter. The stop member 48 has an aperture 56 formed therein which is slightly larger in diameter than the diameter of a plunger 54 of an air cylinder 55 to allow the plunger 54 to freely pass through the aperture 56. The end of the plunger 54 is fixedly secured within an aperture 53 formed in the lower movable plate member 51 so that as the plunger 54 is expelled from the air cylinder 55 the lower movable plate member 51 moves upwardly with it. The lower stop member 48 also has an aperture 60 formed therein which is slightly larger in diameter than the diameter of a cylindrical shaped tube 66 so that the tube 66 can freely pass through the aperture 60. The lower movable plate member 51 has two concentrically positioned apertures 57 and 58 formed therein which substantially correspond in size to that of a valve head 59 attached to the cylindrical shaped tube 66 so that the valve head 59 will normally seat within the apertures 57 and 58, as shown in FIG. 2. The valve head 59 has a concaved recess 61 formed in its top wall and an orifice 62 formed therethrough from the recess 61 to the cylindrical shaped tube 66. A flexible tubing 63 is fixedly secured to the opposite end of the cylindrical shaped tube 66 to direct the flow of air to a pressure sensing device 120, described more fully hereinafter.

An air cylinder 64 is positioned above the top plate member 24 in a fashion such that the tip portion 73 of an orificed member 70 which is secured to the plunger 65 of the air cylinder 64, is in a position to be directed into the valve stem receiving cavity 44 formed in the valve bodies 21 when they are captivated within the slot 25 formed in the top plate member 24. The orificed member 70 has a threaded connection 71 for receiving a flexible tubing or the like through which a source of air is provided, and an aperture 72 which extends from the threaded connection 71 to the tip portion 73.

Referring now to FIGS. 2, 8 and 9, the operation of the test apparatus 10 can be generally described as follows. The valve bodies 21 are individually fed through the inclined ramp 13 to the top plate member 24 whereat they are captivated within the slot 25. The air cylinder 55 is then actuated to expel its plunger 54, which action results in the raising of the lower movable plate member 51 and the valve head 59 which is retained within the apertures 57 and 58 formed therein. When the lower movable plate member 51 engages the lower surface of the rectangular shaped member 27, the valve head 59 enters into the aperture 28 formed in the rectangular shaped member 27 so that the dip tube attachment tails 23 of the valve bodies 21 seat within the concaved recess 61 formed therein. The air cylinder 64 is next actuated to expel its plunger 65 and the tip portion 73 of the orificed member 70 is seated within the valve stem receiving cavity 44 formed in the valve bodies 21. A source of air (not shown) which is coupled to the orificed member 70 is then actuated to provide a source of air which is directed through the orifice 43 formed in the valve bodies 21 and through the cylindrical shaped tube 66 and the flexible tube member 63 to a pressure sensing device 120 which may advantageously be a Jet-tron detector manufactured by Automation Devices, Inc., Erie, Pa.

Normally a first source of air (not shown) is always activated and blows a jet of air through the tube 18. This jet of air is provided to blow defective valve bodies into the conveying tube 19, to the container 20. If the orifice 43 formed in the valve body 21 is of the proper size, the pressure of the air which flows through it will fall within a preestablished pressure range. The pressure sensing device 121 determines whether the pressure falls within this range and if it does the above mentioned first source of air is deactivated and another source of air (not shown) is activated to direct a stream of air through the tube 15 which blows the valve body 21 through the conveying tube 16 to the container 17.

Simultaneously with the activation of the last mentioned source of air, the air cylinder 55 is deactivated so that the lower movable plate member 51 and the valve head 59 restore to their initial position, resting on the stop member 48. The air cylinder 64 remains activated so that its plunger 65 and the orificed member 70 secured thereto is forced downwardly through the slot 25 formed in the top plate member 24 to, in turn, force the valve body 21 into the area 67 so that the jet of air from the tube 15 is effective to blow the same into the conveying tube 16.

If the pressure of the air which passes through the orifice 43 formed in the valve body 21 is less than, or greater than, the preestablished acceptable pressure range, the pressure sensing device 120 will not operate to deactivate the first source of air nor activate the other source of air, so that the air jet directed through the tube 18 blows the defective valve body 21 into the conveying tube 19, to the container 20. During this operation, the air cylinder 55 is deactivated and the valve body 21 pushed into the area 67 by the tip 73 of the orifice member 70, in the manner described above.

Figure 10:
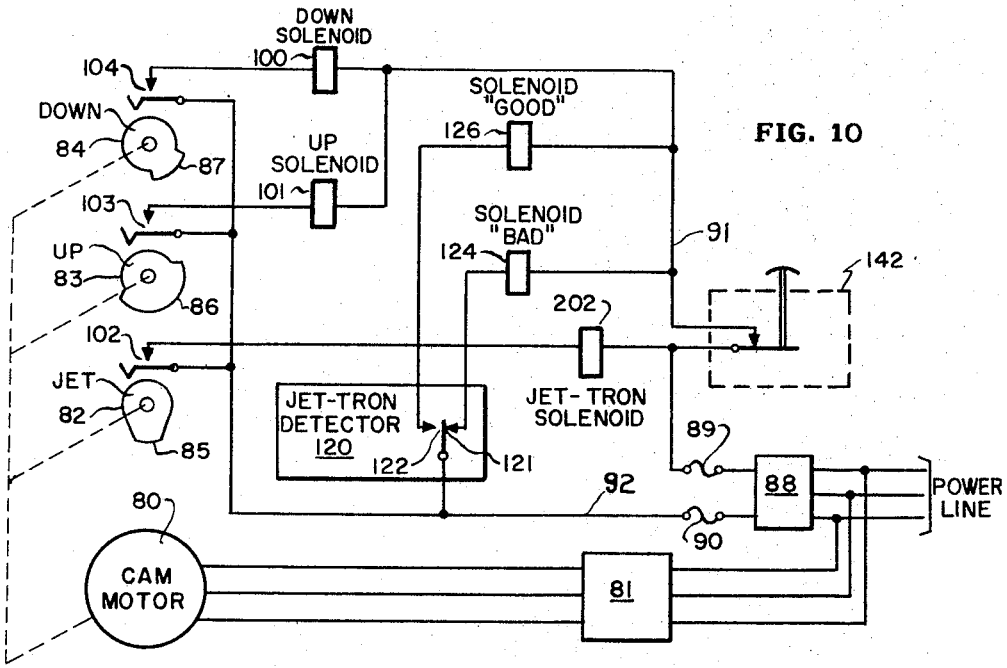
FIGURE 10 is a schematic diagram of the control circuitry of the testing apparatus of the present invention.

The circuitry for controlling the above described operations is shown in FIG. 10. It may then be seen that a 3-phase motor 80 is coupled through an On-Off switch and phase strapping control circuit 81 to the conventional 3-phase power line normally provided to a customer. The axle (not shown) of the motor 80 has three cams 82–84 secured thereto which have cam lobes 85–87 thereon, respectively. These cam lobes 85–87 function to operate contacts 102–104 of three microswitches, respectively, to, in turn, operate solenoids 100–101 and 202, in a manner described more fully hereinafter. These solenoids are coupled to conductors 91 and 92 which are, in turn, coupled through fuses 89 and 90 and an On-Off switch 88 to a commercially available source of power.

It can be seen that the cam lobe 86 on the cam 83 first operates to close the contact 103 to energize the solenoid 101 which, in turn, functions to control the source of air to the air cylinder 55 to activate it to raise its plunger 54, in the manner described. Shortly after the solenoid 101 is energized, the cam lobe 87 on the cam 84 operates the contact 104 to, in turn, energize the solenoid 100. The solenoid 100, in turn, controls the source of air which activates the air cylinder 64 to expel its plunger 65 in the manner described. Cam lobe 85 on the cam 82 next operates the contacts 102 to energize the solenoid 202 which controls the source of air which is coupled through the orificed member 70 and the valve bodies 21 to the pressure sensing device 120.

The pressure sensing device 120 has a normally closed pair of contacts 121 and a normally open pair of contacts 122. A solenoid 124 which controls the source of air which provides the jet of air through the tube 18 is coupled to the conductors 91 and 92 through the normally closed contacts 121 so that the source of air for rejecting defective valve bodies is normally energized. A solenoid 126 which controls the source of air to provide a jet of air through the tube 15 is coupled to the conductors 91 and 92 through the normally open contacts 122. The contacts 121 and 122 are arranged so that the contacts 121 will open before the contacts 122 close and provide a short time delay. In operation, if the pressure sensing device 120 determines that the flow of air through an orifice 43 in a valve body 21 falls within the predetermined pressure range, it operates to open its contact 121 to de-energize the solenoid 124 to cut off the source of air for rejecting the defective valve bodies and to thereafter close its contact 122 to energize solenoid 126 which controls the source of air for blowing the acceptable valve bodies into the conveying tube 16 and into the collector container 17.

It may be noted that the cam lobe 87 on the cam 84 is relatively small compared to the cam lobe 86 on the cam 83 so that the solenoid 100 is deenergized prior to deenergization of the solenoid 101. The lower movable plate member 51, as previously described, therefore restores to its initial position atop the stop member 48 and the plunger 65 of the air cylinder 64 and the tip portion 73 of the orificed member 70 pushes the valve bodies 21 through the orifice 28 formed in the rectangular shaped member 27 and into the area 67. The operation of the solenoids 124 and 126 are coordinated with the operation of the cam lobes 86 and 87 in operating the contacts 103 and 104 so that the valve bodies 21 are within the area 67 before the solenoids 124 and 126 are energized to blow them in the proper conveying tubes 16 and 19.

It can be seen that the operation of the test apparatus 10 is completely automatic and that the orifice 43 formed in the valve bodies 21 can be tested for proper size in a continuous fashion, almost as rapidly as the valve bodies can be confined within the slot 25 formed in the top plate member 24. It is therefore only necessary to keep a continuous supply of valve bodies within the inclined ramp 13.

Figure 11:
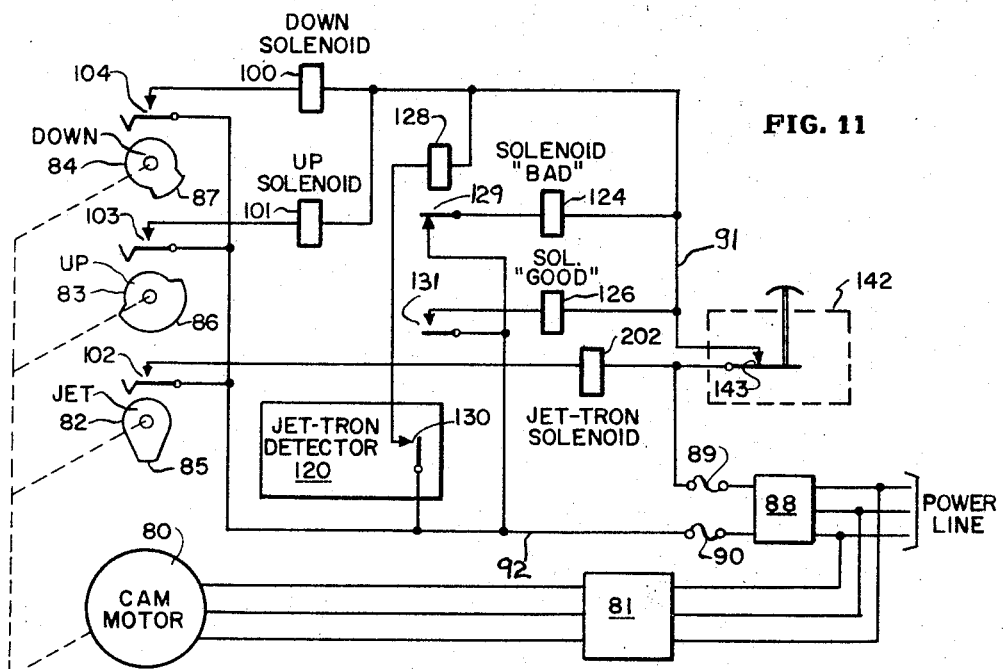
FIGURES 11 and 12 are modifications of the circuitry of FIG. 10.

In FIG. 11, the circuitry of FIG. 10 is shown slightly modified, by adding a relay 128 having normally closed contact 129 for controlling the operation of solenoid 124 and normally open contact 131 for controlling the operation of solenoid 126. The circuitry may be used in the event the particular pressure sensing device 120 has only a single contact 130, instead of two contacts as described above.

The operation is the same as the operation of the circuitry of FIG. 10 except that when the pressure sensing device 120 detects that the valve is acceptable, it operates its contact 130 to energize the relay 128. The contacts 129 and 131 are arranged in the manner previously described, to deenergize the solenoid 124 before energizing solenoid 126.

Figure 12:
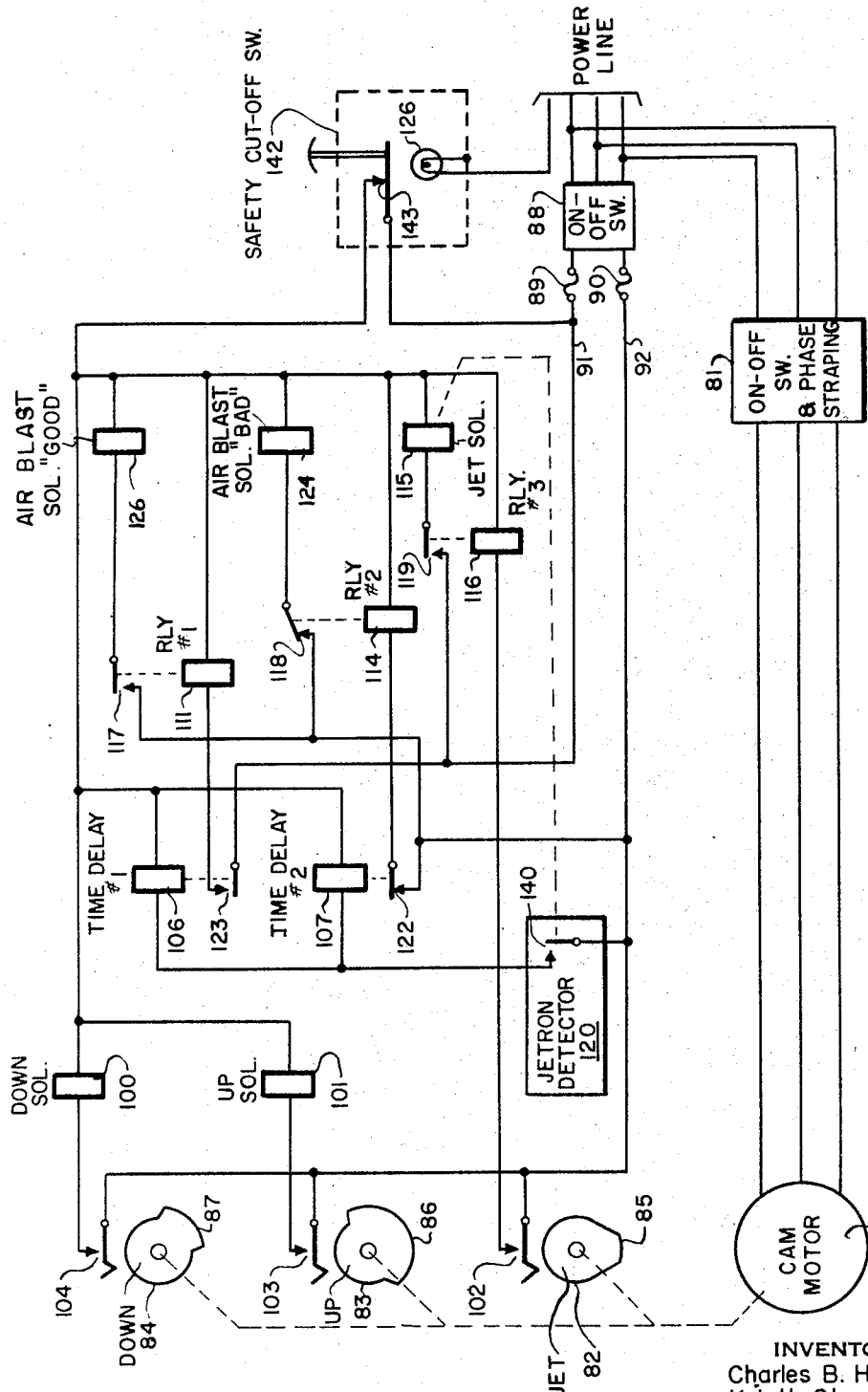

In FIG. 12 there is shown still another modification of the circuitry of FIG. 10 to provide some versatility in operation in the event the valves being tested are of relatively small physical dimensions, which fact may result in some jamming of the mechanism due to its rapid operation. In FIG. 12, the cam lobes 85–87 function to operate the contacts 102–104 of the microswitches, respectively, to, in turn, operate a number of relays which are coupled to the conductors 91 and 92.

It can be seen that the cam lobe 86 on the cam 83 first operates to close the contact 103 to energize the solenoid 101 which controls the source of air to the air cylinder 55 to activate it to raise its plunger 54, in the manner described. Shortly after the solenoid 101 is energized, the cam lobe 87 on the cam 84 operates the contact 104 to energize the solenoid 100 which controls the source of air which activates the air cylinder 64 to expel its plunger 65, in the manner described. Cam lobe 85 on the cam 82 next operates the contacts 102 to energize a relay 116 which, in turn, closes its contact 119 to energize the relay 115. The relay 115 controls the source of air which is coupled through the orificed member 70 and the valve bodies 21 to the pressure sensing device 120.

It may be noted that relay 114 is normally energized to close its contact 118 so that the solenoid 124 which controls the source of air for rejecting defective valve bodies is normally energized. If the pressure sensing device 120 determines that the flow of air through an orifice 43 in a valve body 21 falls within the predetermined pressure range, it operates to close its contact 140 to energize two time delay relays 106 and 107. These relays are timed so that the time delay relay 107 operates first to open its contact 122 to deenergize relay 114. When relay 114 is deenergized its contact 118 opens and, in turn, deenergizes the solenoid 124. The source of air for rejecting the defective valve bodies is thereby cut off. Thereafter, time delay relay 106 closes its contact 123 to energize relay 111 which, in turn, closes its contact 117 to energize solenoid 126 which controls the source of air for blowing the acceptable valve bodies into the conveying tube 16 and into the collector container 17.

The operation of the time delay relays 106 and 107 are coordinated with the operation of the cam lobes 86 and 87 in operating the contacts 103 and 104 so that the valve bodies 21 are within the area 67 before the solenoids 124 or 126 are energized to blow them in the proper conveying tubes 16 or 19.

In FIGS. 10–12, it can be seen that a safety cut-off switch 142 is included in the circuitry of the test apparatus 10. If the valve bodies 21 become jammed within the mechanism of the test apparatus, the switch 142 can be depressed to open its contact 143, which action is effective to immediately deenergize the circuitry, by opening one side of the power line.

The motor 80 can be provided with an extended axle and a number of series of cams 82–84 can be fixedly secured to it to operate simultaneously the circuitry for a number of the test apparatus 10, if it is so desired. Also, the same sources of air for the above described operations can be coupled to each of the test apparatus so it is unnecessary to duplicate this equipment. It is of course, apparent that only a single source of air need be provided, with proper valving to direct the air, as desired. It can therefore be seen that the described arrangement is extremely adaptable to operate one, or many test apparatus 10, with a minimum amount of duplication of equipment.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

Now that the invention has been described, what is claimed as new and desired to be secured by Letters Patent is:

1. Apparatus for automatically testing the size of an orifice formed in a component and for rejecting defective components which do not have proper size orifices comprising captivating means adapted to captivate individual ones of said components; a first component testing means having an orifice formed therein adapted to engage the lower surfaces of said individual components captivated by said captivating means; a second component testing means having an orifice formed therein and adapted to engage the upper surfaces of said individual components captivated by said captivating means; a first source of air coupled to said second component testing means for providing a jet of air through said orifices formed in said first and second component testing means and said component; pressure sensing means coupled to said second component testing means for detecting the pressure of said jet of air passed through said orifices and for activating a second and a third source of air to blow said components into collecting means for acceptable and defective components, respectively, in accordance with the detected pressure of said jet of air, and means for operating said first and second component testing means to engage said individual component and to release said individual components upon actuation of the respective one of said second and third sources of air.

2. Apparatus for automatically testing the size of an orifice formed in a component and for rejecting defective components which do not have proper size orifices comprising feeder means for continuously feeding components to said apparatus; captivating means adapted to captivate individual ones of said components; a first component testing means having an orifice formed therein adapted to engage the lower surfaces of said individual components captivated by said captivating means; a second component testing means having an orifice formed therein and adapted to engage the upper surfaces of said individual components captivated by said captivating means; a first source of air coupled to said second component testing means for providing a jet of air through said orifices formed in said first and second component testing means and said component; pressure sensing means coupled to said second component testing means for detecting the pressure of said jet of air passed through said orifices and for activating a second and a third source of air to blow said components into collecting means for acceptable and defective components, respectively, in accordance with the detected pressure of said jet of air, and means for operating said first and second component testing means to engage said individual component and to release said individual components upon actuation of the respective one of said second and third source of air.

3. Apparatus, as claimed in claim 2, wherein said feeder means includes a vibratory feeder bowl and an inclined ramp coupled to said vibratory feeder bowl and said captivating means.

4. Apparatus for automatically testing the size of an orifice formed in a component and for rejecting defective components which do not have proper size orifices comprising captivating means adapted to captivate individual ones of said components; said captivating means including an aperture and a pair of spring loaded plungers slidably retained in slots laterally disposed on opposite sides of said aperture, the ends of which normally engage a component to prevent it from dropping through said aperture; a first component testing means having an orifice formed therein adapted to engage the lower surfaces of said individual components captivated by said captivating means; a second component testing means having an orifice formed therein and adapted to engage the upper surfaces of said individual components captivated by said captivating means; a first source of air coupled to said second component testing means for providing a jet of air through said orifices formed in said first and second componet testing means and said component; pressure sensing means coupled to said second component testing means for detecting the pressure of said jet of air passed through said orifices and for activating a second and a third source of air to blow said components into collecting means for acceptable and defective components, respectively, in accordance with the detected pressure of said jet of air, and means for operating said first and second component testing means to engage said individual component and to release said individual components upon actuation of the respective one of said second and third source of air.

5. Apparatus for automatically testing the size of an orifice formed in a component and for rejecting defective components which do not have proper size orifices comprising captivating means adapted to captivate individual ones of said components; a first component testing means having an orifice formed therein; a first air cylinder having a plunger adapted to raise said first component testing means to engage the lower surfaces of said individual components captivated by said captivating means; a second component testing means having an orifice formed therein; a second air cylinder having a plunger adapted to lower said second component testing means to engage the upper surfaces of said individual components captivated by said captivating means; a first source of air coupled to said second component testing means for providing a jet of air through said orifices formed in said first and second component testing means and said component; pressure sensing means coupled to said second component testing means for detecting the pressure of said jet of air passed through said orifices and for activating a second and a third source of air to blow said components into collecting means for acceptable and defective components, respectively, in accordance with the detected pressure of said jet of air, and means for operating said first and second air cylinders to engage said first and second component testing means with said individual component and to release said individual components upon actuation of the respective one of said second and third source of air.

6. Apparatus, as claimed in claim 5, wherein said means for operating said first and second air cylinders is adapted to operate said first air cylinder prior to the operation of said second air cylinder and to release said first air cylinder prior to the release of said second air cylinder.

7. Apparatus for automatically testing the size of an orifice formed in a component and for rejecting defective components which do not have proper size orifices comprising captivating means adapted to captivate individual ones of said components, said captivating means including an aperture and a pair of spring loaded plungers slidably retained in slots laterally disposed on opposite sides of said aperture, the ends of which normally engage a component to prevent it from dropping through said aperture; a first component testing means having an orifice formed therein; a first air cylinder having a plunger adapted to raise said first component testing means to engage the lower surfaces of said individual components captivated by said captivating means; a second component testing means having an orifice formed therein; a second air cylinder having a plunger adapted to lower said second component testing means to engage the upper surfaces of said individual components captivated by said captivating means; a first source of air coupled to said second component testing means for providing a jet of air through said orifices formed in said first and second component testing means and said component; pressure sensing means coupled to said second component testing means for detecting the pressure of said jet of air passed through said orifices and for activating a second and a third source of air to blow said components into collecting means for acceptable and defective components, respectively, in accordance with the detected pressure of said jet of air, and means for operating said first and second air cylinders to engage said first and second component testing means with said individual component and to release said second air cylinder after releasing said first air cylinders, said second air cylinder being effective to push said individual components between said pair of plungers prior to actuation of the respective one of said second and third source of air.

8. Apparatus for automatically testing the size of an orifice formed in a component and for rejecting defective components which do not have proper size orifices comprising captivating means adapted to captivate individual ones of said components, a stop member fixedly retained below said captivating means in spaced relationship thereto; a movable plate member retained by said stop member and adapted to be raised to engage said captivating means; a first component testing means having an orifice formed therein fixedly secured to said movable plate member and raised thereby to engage said captivated component; a second component testing means having an orifice formed therein adapted to be lowered to engage the upper surface of said captivated component; a first source of air coupled to said second component testing means for providing a jet of air through said orifices formed in said first and second component testing means and said component; pressure sensing means coupled to said first component testing means for detecting the pressure of said jet of air passed through said orifices and for activating a second and a third source of air to blow said components into collecting means for acceptable and defective components, respectively, in accordance with the detected pressure of said jet of air, and means for raising said movable plate member and for lowering said second component testing means to engage said captivated component.

9. Apparatus for automatically testing the size of an orifice formed in a component and for rejecting defective components which do not have proper size orifices comprising captivating means adapted to captivate individual ones of said components, a stop member fixedly retained below said captivating means in spaced relation thereto; a movable plate member retained by said stop member; a first air cylinder having a plunger fixedly secured to and operable to raise said movable plate member; a first component testing means having an orifice formed therein fixedly secured to said movable plate member and raised thereby to engage said captivated component; a second air cylinder having a plunger; a second component testing means having an orifice formed therein fixedly secured to said plunger of said second air cylinder and lowered thereby to engage the upper surface of said captivated component; a first source of air coupled to said second component testing means for providing a jet of air through said orifices formed in said first and second component testing means and said component; pressure sensing means coupled to said first component testing means for detecting the pressure of said jet of air passed through said orifices and for activating a second and a third source of air to blow said components into collecting means for acceptable and defective components, respectively, in accordance with the detected pressure of said jet of air, and means for operating said first and second air cylinders to engage said first and second component testing means with said captivated component.

10. Apparatus for automatically testing the size of an orifice formed in a component and for rejecting defective components which do not have proper size orifices comprising captivating means adapted to captivate individual ones of said components, said captivating means including an aperture and a pair of spring loaded plungers slidably retained in slots laterally disposed on opposite sides of said aperture, the ends of said plungers normally engaging a component to prevent it from dropping through said aperture; a stop member fixedly retained below said captivating means in spaced relation thereto; a movable plate member retained by said stop member; a first air cylinder having a plunger fixedly secured to and operable to raise said movable plate member; a first component testing means having an orifice formed therein fixedly secured to said movable plate member and raised thereby to engage said captivated component; a second air cylinder having a plunger; a second component testing means having an orifice formed therein fixedly secured to said plunger of said second air cylinder and lowered thereby to engage the upper surface of said captivated component; a first source of air coupled to said second component testing means for providing a jet of air through said orifices formed in said first and second component testing means and said component; pressure sensing means coupled to said first component testing means for detecting the pressure of said jet of air passed through said orifices and for activating a second and a third source of air to blow said components into collecting means for acceptable and defective components, respectively, in accordance with detected pressure of said jet of air, and means for operating said first and second air cylinders to engage said first and second component testing means with said captivated component.

11. Apparatus for automatically testing the size of an orifice formed in a component and for rejecting defective components which do not have proper size orifices comprising captivating means adapted to captivate individual ones of said components; a first component testing means having an orifice formed therein adapted to engage the lower surfaces of said individual captivated components; a second component testing means having an orifice formed therein and adapted to engage the upper surfaces of said individual captivated components; a first source of air coupled to said second component testing means for providing a jet of air through said orifices formed in said first and second component testing means and said component; pressure sensing means coupled to said second component testing means for detecting the pressure of said jet of air passed through said orifices and for activating a second and a third source of air to blow said components into collecting means for acceptable and defective components, respectively, in accordance with the detected pressure of said jet of air, and means for operating said apparatus including a source of power; first means coupled to said source of power for actuating said first and said second component testing means; second means coupled to said source of power for actuating said first source of air; motor means having an extended axle; switch means included in said coupling between said source of power and said first and second means; a plurality of cams connected to said axle and adapted to operate said switch means to operate said first and second means; and means coupled to said source of power and operated by said pressure sensing means to control the operation of said second and third sources of air.

12. Apparatus as claimed in claim 11 wherein said first means is adapted to actuate said first component testing means prior to actuating said second component testing means and to release said first component testing means prior to releasing said second component testing means.

13. Apparatus as claimed in claim 11 wherein said third source of air is normally actuated and said pressure sensing means is adapted to actuate said means for controlling the operation of said second and third sources of air to first cut off said third source of air and to then actuate said first source of air.

14. Apparatus for automatically testing the size of an orifice formed in a component and for rejecting defective components which do not have proper size orifices comprising captivating means adapted to captivate individual ones of said components; a first component testing means having an orifice formed therein; a first air cylinder having a plunger adapted to raise said first component testing means to engage the lower surfaces of said individual components captivated by said captivating means; a second component testing means having an orifice formed therein; a second air cylinder having a plunger adapted to lower said second component testing means to engage the upper surfaces of said individual components captivated by said captivating means; a first source of air coupled to said second component testing means for providing a jet of air through said orifices formed in said first and second component testing means and said component; pressure sensing means coupled to said second component testing means for detecting the pressure of said jet of air passed through said orifices and for activating a second and a third source of air to blow said components into collecting means for acceptable and defective components, respectively, in accordance with the detected pressure of said jet of air, and means for operating said apparatus including a source of air coupled to said first and second air cylinders; a source of power; first means coupled to said source of power for coupling said source of air to said first and second air cylinders; second means coupled to said source of power for actuating said first source of air; motor means having an extended shaft; switch means included in said coupling between said source of power and said first and second means; a plurality of cams connected to said shaft and adapted to operate said switch means to operate said first and second means; and means coupled to said source of power and operated by said pressure sensing means to control the operation of said second and third sources of air.

15. Apparatus as claimed in claim 14 wherein said first means is adapted to actuate said first air cylinder prior to actuating said second air cylinder and to release said first air cylinder prior to releasing said second air cylinder.

16. Apparatus as claimed in claim 15 wherein said first means comprises a pair of solenoids adapted to couple said source of air to said first and second air cylinders, respectively.

17. Apparatus as claimed in claim 14 wherein pressure sensing means includes a normally closed contact and a normally open contact and wherein said second means comprises a first solenoid coupled by said normally closed contact to said source of power for actuating said first source of air and a second solenoid coupled by said normally open contact to said source of power for actuating said second source of air, said pressuring sensing means upon operation being effective to de-energize said first solenoid and to energize said second solenoid.

18. Apparatus as claimed in claim 14 wherein said pressure sensing means includes a normally open contact and wherein said second means comprises a relay having a normally open contact and a normally closed contact, said relay being coupled by said normally open contact of said pressure sensing means to said source of power; a first solenoid coupled by said normally closed contact of said relay to said source of power for actuating said first source of air and a second solenoid coupled by said normally open contact to said source of power for actuating said second source of air, said pressure sensing means upon operation being effective to energize said relay to operate its contacts to deenergize said first solenoid and to energize said second solenoid.

19. Apparatus as claimed in claim 14 wherein said pressure sensing means includes a normally open contact and wherein said second means comprises a pair of time delay relays coupled by said normally open contact to said source of power; a first normally operated relay having a contact, said first relay being controlled by one of said time delay relays; a first solenoid coupled by said contact of said first relay to said source of power and operative to actuate said first source of air; a second relay having a contact, said second relay being controlled by the other one of said time delay relays; a second solenoid coupled by said contact of said second relay to said source of power and operative to actuate said second source of air, said first mentioned time delay relay being adapted to operate before said second mentioned time delay relay.

References Cited

UNITED STATES PATENTS 2,863,316  12/1958  Abplanalp _____ 73—45
3,034,645  5/1962   Groppe _____ 209—74 X
3,258,117  6/1966   Domeck _____ 209—73

M. HENSON WOOD, JR., *Primary Examiner.*

R. A. SCHACHER, *Assistant Examiner.*

U.S. Cl. X.R.

73—37.9, 45.2